US007552363B2

(12) United States Patent
Woodhouse

(10) Patent No.: US 7,552,363 B2
(45) Date of Patent: Jun. 23, 2009

(54) GENERATION OF TRACE ELEMENTS WITHIN A DATA PROCESSING APPARATUS

(75) Inventor: Sheldon James Woodhouse, Caythorpe (GB)

(73) Assignee: ARM Limited, Cambridge (GB)

( * ) Notice: Subject to any disclaimer, the term of this patent is extended or adjusted under 35 U.S.C. 154(b) by 495 days.

(21) Appl. No.: 11/387,053

(22) Filed: Mar. 23, 2006

(65) Prior Publication Data

US 2007/0226544 A1   Sep. 27, 2007

(51) Int. Cl.
 *G06F 11/00* (2006.01)
(52) U.S. Cl. ...................................................... 714/45
(58) Field of Classification Search ....................... None
 See application file for complete search history.

(56) References Cited

U.S. PATENT DOCUMENTS

| 5,442,350 | A  | * | 8/1995  | Iyer et al. ........................ 341/51 |
| 5,561,421 | A  | * | 10/1996 | Smith et al. ..................... 341/51 |
| 5,951,623 | A  | * | 9/1999  | Reynar et al. ................. 708/203 |
| 6,100,824 | A  | * | 8/2000  | MacLeod et al. ............... 341/51 |
| 6,918,065 | B1 | * | 7/2005  | Edwards et al. ................ 714/45 |
| 6,971,092 | B1 | * | 11/2005 | Chilimbi ...................... 717/158 |
| 7,080,283 | B1 | * | 7/2006  | Songer et al. .................. 714/30 |
| 7,209,058 | B2 | * | 4/2007  | Swoboda ....................... 341/63 |
| 2002/0049861 | A1 | * | 4/2002 | Bunn et al. ................... 709/247 |
| 2002/0059462 | A1 | * | 5/2002 | Hannu et al. ................. 709/247 |
| 2004/0030962 | A1 |   | 2/2004 | Swaine et al. |
| 2004/0103399 | A1 | * | 5/2004 | Agarwala et al. ............ 717/128 |
| 2004/0221201 | A1 | * | 11/2004 | Seroff ......................... 714/30 |
| 2005/0010728 | A1 | * | 1/2005 | Piry et al. .................... 711/147 |

OTHER PUBLICATIONS

"Dictionary Coder", Wikipedia, Jul. 9, 2008.*

* cited by examiner

*Primary Examiner*—Gabriel L Chu
(74) *Attorney, Agent, or Firm*—Nixon & Vanderhye P.C.

(57) ABSTRACT

A data processing apparatus and method for generating trace elements is provided. The data processing apparatus comprises logic producing a series of data elements, indicative of the operation or state of all or part of the logic. Trace logic is provided for receiving indications of these data elements, and for generating from the indications a stream of trace elements. When for a given data element, at least part of the data element is derivable from a reference to a control value stored in a storage element, the trace logic is operable, dependent on that data element, to omit that part of the associated data element indication from the corresponding trace element generated in respect of the data element, instead including a reference to the corresponding storage element. A trace analysing apparatus can then be used to reconstruct such omitted information based on a copy of the relevant storage element.

14 Claims, 8 Drawing Sheets

GENERATION OF TRACE ELEMENTS WITHIN A DATA PROCESSING APPARATUS

BACKGROUND OF THE INVENTION

1. Field of the Invention

The present invention relates to the generation of trace elements representative of at least some data elements produced by logic within a data processing apparatus.

2. Description of the Prior Art

Tracing the activity of a data processing system whereby a stream of trace elements is generated including data representing the step-by-step activity within the system is a highly useful tool in system development. However, with the general move towards more deeply embedded processor cores, it becomes more difficult to track the activities of the processor core or other on-chip devices via externally accessible pins. Accordingly, as well as off-chip tracing mechanisms for capturing and analyzing trace data, increased amounts of tracing functionality are being placed on-chip. An example of such on-chip tracing mechanisms is the Embedded Trace Macrocell (ETM) provided by ARM Limited, Cambridge, England, in association with a variety of their ARM processors.

Such tracing mechanisms produce in real-time a stream of trace elements representing activities of the data processing apparatus that are desired to be traced. This trace stream can then subsequently be analyzed for a variety of purposes, for example to facilitate debugging of sequences of processing instructions being executed by the data processing apparatus, for performing profiling operations in order to determine the performance of particular program code being executed on the data processing apparatus, etc.

Typically, the stream of trace elements that is generated by the trace mechanism is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analyzing tool is provided which receives the stream of trace elements from the trace buffer when desired, for example once the trace has completed. The trace analyzing tool can then be used to reconstruct the activities of the device being traced based on the received trace elements. As devices such as processor cores increase in power and complexity, it is clear that the amount of information required to track the activities of such devices will increase, and accordingly there will potentially be a very large volume of trace elements that need to be traced.

However, there is a problem that there is finite bus bandwidth over which the trace elements can be output by the trace logic, and any trace buffer used to buffer such trace elements will have a finite size. Accordingly, the volume of trace elements that can be generated is limited.

The activities of a device that might want to be traced include, but are not limited to, the instructions being executed by a processor core (referred to as instruction trace), and the memory accesses made by those instructions (referred to as data trace). These activities may be individually traced or traced together, so that the data trace can be correlated with the instruction trace. The data trace itself consists of two parts, the memory addresses and the data values, referred to (respectively) as data address and data value trace. Again, the existing trace ETM protocols allow for data address and data value tracing to be enabled independently or simultaneously.

Experience shows that for existing processor cores and ETM protocols, a bit rate of less than 2 bits per instruction is achieved for instruction tracing only. However, to illustrate the above problem, a bit rate of approximately 10 to 16 bits per instruction is achieved for instruction and data address tracing. Therefore a processor having an operating speed of approximately 1 GHz executing one instruction per cycle will generate approximately 10 to 16 Gbits/s of trace data, all of which must be taken off-chip and captured in a fixed-size buffer. In addition to tracing instructions and data addresses, certain classes of problem also require data value tracing to be performed, and this will further increase the amount of trace data that needs to be generated to over 20 bits per instruction. Collectively, the two elements of data tracing, namely the data address tracing and the data value tracing, contribute to a large proportion of the overall volume of trace elements produced.

ARM Limited's co-pending U.S. patent application Ser. No. 10/452,904 describes a technique where a trace generation unit maintains a table used to identify architectural state derivable from previously generated trace elements, with the trace generation unit then referencing that table in order to determine which trace elements to generate during the trace generation. This can enable the number of trace elements required to be generated to be reduced, since the table provides a record of the architectural state which has already been provided to the recipient of the trace stream. Whilst such an approach provides some benefits in reducing the volume of trace elements produced, it requires the maintenance of a table within the trace logic, and can only start to reduce the amount of trace once the table has been populated to provide a history of architectural state that has already been provided by previous trace elements of the trace stream.

Accordingly, it would be desirable to provide an improved technique for generating a stream of trace elements, so as to enable more effective use to be made of the finite bus bandwidth over which the trace elements can be output, and the finite size of any trace buffer in which those trace elements are buffered.

SUMMARY OF THE INVENTION

Viewed from a first aspect, the present invention provides a data processing apparatus comprising: logic operable to produce data elements; trace logic operable to produce a stream of trace elements representative of at least some of said data elements, the trace logic having trace generation logic operable to generate trace elements for inclusion in said stream; and at least one storage element, each storage element operable to store a control value; for a data element to be represented in said stream, the trace generation logic being operable, if at least a part of that data element is derivable from a control value stored in said at least one storage element, to generate an associated trace element comprising a storage element indication indicating the storage element storing that control value and any data element indication required to indicate a part of the data element not derivable from that control value.

In accordance with the present invention the trace logic is arranged, when generating a trace element to represent a data element, and if at least a part of the data element is derivable from a control value stored in a storage element accessible to the trace logic, to omit that part of the associated data element indication from the corresponding trace element, instead including a reference to that storage element. This enables a significant reduction in the amount of trace data required to be produced, in situations where the data element can later be reconstructed with reference to the control value.

The data elements received by the trace logic can take a variety of forms provided they give sufficient information for the required stream of trace elements to be generated therefrom. Further, the data elements may be transmitted from the logic (also referred to herein as a device under test) to the trace logic, or alternatively may be retrieved by the trace logic from the device under test.

Similarly, the storage element indication within the trace element can take a variety of forms, so long as the trace element gives sufficient information about the relationship between the original data element and the content of the storage element, to enable that information to be reconstructed by the relevant trace analysing tool. As an example, in one embodiment where the received data elements being monitored are 32-bit data addresses, a storage element may contain an indication of the 16 MSBs (most significant bits) defining an address range of interest. Thus, a trace element for a particular 32-bit address may be represented by a reference to the storage element containing an indication of the 16 MSBs and an indication of the remaining 16 LSBs (least significant bits).

Through use of the present invention, it has been found that the volume of trace elements that need to be generated to track the activity of the device under test can be significantly reduced whilst still enabling a similar amount of information about the activities of the device to be deduced by a trace analysing tool. All that is required is for the trace analysing tool to maintain a copy of the control values in the storage elements referenced by the trace generating logic which can then be used when reconstructing the omitted information.

In situations where there are multiple storage elements, it may be the case that, in representing a data element with a trace element, at least a part of the data element is derivable with reference to multiple storage elements accessible to the trace logic, and thus the generated trace element will include a reference to more than one storage element.

The storage elements may be positioned in a variety of locations provided they are accessible by the trace logic. In one embodiment the storage elements are provided within the trace logic.

The storage elements may be provided specifically for the purpose of being referenced by the trace generation logic. However in one embodiment, the trace logic further comprises control logic operable to determine which of said data elements are to be represented by said stream of trace elements, the control logic being operable to reference the control value in said at least one storage element when performing said determination. Hence, a user is able to define, by storing appropriate control values in the available storage elements, which received data elements are of interest and should therefore be represented in the generated stream of trace elements. This may for example be achieved by specifying particular values of data elements of interest in the storage elements, or by specifying ranges of values. In this embodiment, these same storage elements are then referenced by the trace generation logic when deciding whether at least a part of a data element to be traced can be derived from a control value stored therein. Moreover, since such storage elements for steering the operation of the trace generation logic, under the control of associated control logic, are a typical feature of a block of trace logic, the references made to these storage elements by the trace generation logic are possible without the need to provide expensive additional storage space on-chip explicitly for storing such references.

The logic producing the data elements may take a variety of forms. In one embodiment, the logic is a plurality of devices coupled via a bus over which said data elements are routable between the devices. Hence the activity on a bus may be monitored, an example of the activity on the bus that may be of interest for tracing being the address of a memory access and the data value of a memory access.

In one embodiment, said trace logic is operable to output said stream of trace elements for analysis by a trace analysing tool which has knowledge of the control value stored in each storage element. Thus, the trace analysing tool may reconstruct an indication of the data element traced, by identifying the storage element indication in the trace element and referencing the control value known to be stored in that storage element. In this way, the trace analysing tool has access to a greater quantity of information about the device under test than it is necessary for the trace generation logic to output in the stream of trace elements, saving bandwidth and/or storage space in an environment where both are precious.

The control values in the storage elements may be predetermined. However, in one embodiment, the control value stored in each storage element is programmable by a trace analysing tool. Hence, a user investigating the device under test may define a suitable control value which the trace generation logic may then reference in its generated trace stream. With the aim of compressing the generated trace stream as greatly as possible, this control value will typically be a value which is expected to occur at least once, if not multiple times, in the received data elements and hence the expense of storing this value is outweighed by the advantage of being able to include it by reference, rather than explicitly, in the generated trace stream.

In one embodiment, the data element indication indicates the data content of said part of the data element not derivable from said control value. For example, where a 32-bit data address should be represented in the generated trace stream and a storage element contains an indication of the 16 MSBs of the address, then this address may be represented by a reference to the storage element containing the indication of the 16 MSBs and an explicit indication of the remaining 16 LSBs. However, the situation may arise where only an indication of where a difference to a stored control value occurs is necessary. For example, a 32-bit instruction address may be stored in a particular storage element. A data element comprising a 32-bit instruction address, identical to the stored instruction address in all but the 2 LSBs may then be represented in the generated trace stream by a reference to the storage element and an indication that the 2 LSBs do not match. Hence, in one embodiment, the data element indication indicates the location within said data element of said part of the data element not derivable from said control value. In a further variation, is may prove necessary to provide both an indication of which bits of the received data element differ from the stored control value and an indication of what those differences are. For example, an indication of 2 differing bits may by default refer to the 2 LSBs of the referenced control value, but it may be necessary to indicate that in a particular instance it is the $6^{th}$ and $7^{th}$ LSBs that differ from the referenced value. Thus, in one embodiment, the data element indication indicates the location within said data element of said part of the data element not derivable from said control value and the data content of said part of the data element not derivable from said control value.

Viewed from a second aspect, the present invention provides trace logic for generating a stream of trace elements representative of at least some data elements produced by logic of a data processing apparatus, said trace logic comprising: trace generation logic operable to generate trace elements for inclusion in said stream; and at least one storage element, each storage element operable to store a control value; for a data element to be represented in said stream, the trace generation logic being operable, if at least a part of that data element is derivable from a control value stored in said at least one storage element, to generate an associated trace element comprising a storage element indication indicating the storage element storing that control value and any data element indication required to indicate a part of the data element not derivable from that control value.

Viewed from a third aspect, the present invention provides a trace analysing apparatus for analysing a stream of trace elements generated by a data processing apparatus according to the first aspect, comprising: a reference store for storing indications of the control value stored in each storage element; a trace expander operable to receive the stream of trace elements generated by the data processing apparatus and to produce a modified stream of trace elements containing at least one new data element indication by: identifying a storage element indication within the stream of trace elements; generating a new data element indication indicating the at least part of the data element derivable from the control value in said storage element indicated by the storage element indication, by reference to said reference store; and outputting said new data element indication in said modified stream of trace elements in place of said storage element indication.

In accordance with this aspect of the present invention, the trace expander identifies from the stream of trace elements a trace element which contains a reference to a storage element in the trace logic, where at least part of an associated data element indication has been omitted, and is then able to generate that omitted data element indication with reference to a copy of the control value in that storage element of the trace logic. This results in an expanded stream of trace elements that then can be used for analysis, for example debugging, profiling, etc.

Viewed from a fourth aspect, the present invention provides a data processing system comprising: logic operable to produce data elements; trace logic operable to produce a stream of trace elements representative of at least some of said data elements, said trace logic having trace generation logic operable to generate trace elements for inclusion in said stream; at least one storage element, each storage element operable to store a control value; for a data element to be represented in said stream, the trace generation logic being operable, if at least a part of that data element is derivable from a control value stored in said at least one storage element, to generate an associated trace element comprising a storage element indication indicating the storage element storing that control value and any data element indication required to indicate a part of the data element not derivable from that control value; a reference storage for storing indications of the control value stored in each storage element; a trace expander operable to receive the stream of trace elements generated by the trace logic and to produce a modified stream of trace elements containing at least one new data element indication by: identifying a storage element indication within the stream of trace elements; generating a new data element indication indicating the at least part of the data element derivable from the control value in said storage element indicated by the storage element indication, by reference to said reference store; and outputting said new data element indication in said modified stream of trace elements in place of said storage element indication.

Viewed from a fifth aspect, the present invention provides a method of operating a data processing system, comprising the steps of: producing data elements; employing trace logic to receive indications of said data elements, and to produce a stream of trace elements representative of at least some of said data elements, for a data element to be represented in said stream, when at least a part of said data element is derivable from one or more control values stored in at least one storage element, generating an associated trace element comprising a storage element indication indicting the at least one storage element storing that control value and any data element indication required to indicate a part of the data element not derivable from that control value; storing in a reference store indications of the control values stored in each storage element of said trace logic; producing from the stream of trace elements generated by the trace logic a modified stream of trace elements containing at least one new data element indication by: identifying a storage element indication within the stream of trace elements; generating a new data element indication indicating the at least part of the data element derivable from the control value in said storage element indicated by the storage element indication, by reference to the reference store; and outputting said new data element indication in said modified stream of trace elements in place of said storage element indication.

Viewed from a sixth aspect, the present invention provides a method of operating trace logic, comprising the steps of: receiving indications of data elements produced by logic of a data processing apparatus; producing a stream of trace elements representative of at least some of said data elements, for a data element to be represented in said stream, when at least a part of said data element is derivable from one or more control values stored in at least one storage element accessible by the trace logic, generating an associated trace element comprising a storage element indication indicting the at least one storage element storing that control value and any data element indication required to indicate a part of the data element not derivable from that control value.

Viewed from a seventh aspect, the present invention provides a method of analysing a stream of trace elements generated in accordance with the sixth aspect, comprising the steps of: storing in a reference store indications of the control values stored in each storage element of trace logic; producing from a stream of trace elements generated by logic of a data processing apparatus a modified stream of trace elements containing at least one new data element indication by: identifying a storage element indication within the stream of trace elements; generating a data element indication indicating the at least a part of a data element derivable from a control value in said storage element indicated by the storage element indication, by reference to the reference store; and outputting said new data element indication in said modified stream of trace elements in place of said storage element indication.

Viewed from a eighth aspect, the present invention provides a computer program product comprising a computer program operable to cause a computer to analyse a stream of trace elements generated in accordance with the sixth aspect by performing the steps of: (i) storing in a reference store indications of the control values stored in each storage element of said trace logic; (ii) producing from a stream of trace elements generated by logic of a data processing apparatus a modified stream of trace elements containing at least one new data element indication by: identifying a storage element indication within the stream of trace elements; generating a data element indication indicating the at least part of a data element derivable from a control value in said storage element indicated by the storage element indication, by reference to the reference store; and outputting said new data element indication in said modified stream of trace elements in place of said storage element indication.

BRIEF DESCRIPTION OF THE DRAWINGS

The present invention will be described further, by way of example only, with reference to embodiments thereof as illustrated in the accompanying drawings, in which.

DESCRIPTION OF PREFERRED EMBODIMENTS

Figure 1:
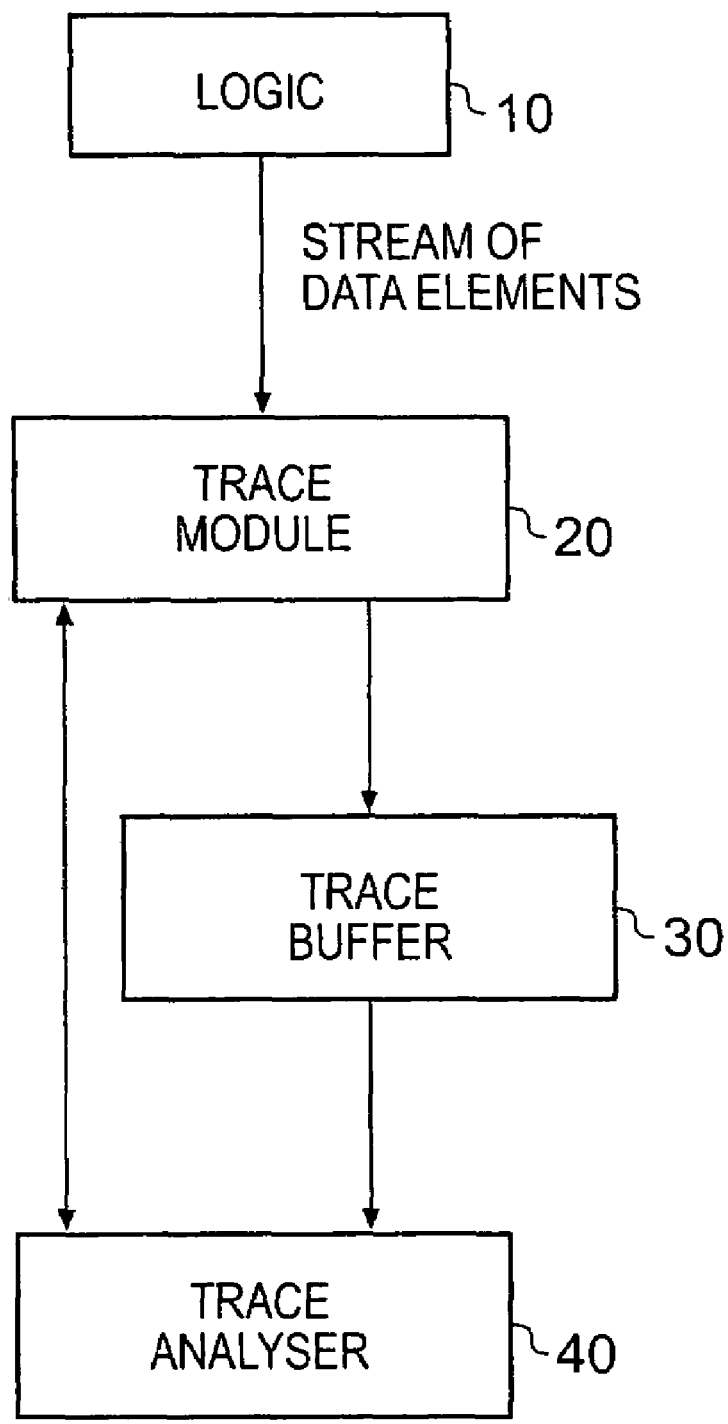
FIG. 1 is a block diagram of a data processing system is accordance with one embodiment of the present invention.

FIG. 1 schematically illustrates a data processing system providing logic 10, a trace module 20, a trace buffer 30 and a trace analyser 40. Whilst FIG. 1 illustrates a data processing system providing a trace buffer 30, in alternative embodiments the trace module 20 may pass its output straight to the trace analyser 40, without going via a trace buffer.

The logic 10 producing the stream of data elements received by the trace module 20 can take a variety of forms, and may for example be a processor core, a Direct Memory Access (DMA) engine, a data engine/accelerator, etc. Alternatively, the logic 10 may consist of a plurality of devices coupled by a bus, and the data elements may be monitored by the trace module 20 as they pass over the bus.

The trace analyser 40, which may in one embodiment be formed by a general purpose computer running appropriate software, is coupled to the trace module 20 and the trace buffer 30. The trace module 20, typically embodied on-chip, is arranged to receive data elements from logic 10 and dependent thereon produces a stream of trace elements which are stored in the trace buffer 30 (which may be provided on or off chip). The trace analyser 40, typically embodied off-chip, is then used to analyse that stream of trace elements in order to derive information indicative of the activities of the logic being traced 10. In particular, through analysis of the stream of trace elements, the detailed activity of the logic 10 can be determined.

The trace analyser 40 is connected to the trace module 20 to enable certain features of the trace module to be controlled by the user of the trace analyser. Additionally, in some embodiments, the stream of trace elements produced by the trace module 20 may be provided directly to the trace analyser 40 rather than being buffered in the trace buffer 30.

Figure 2:
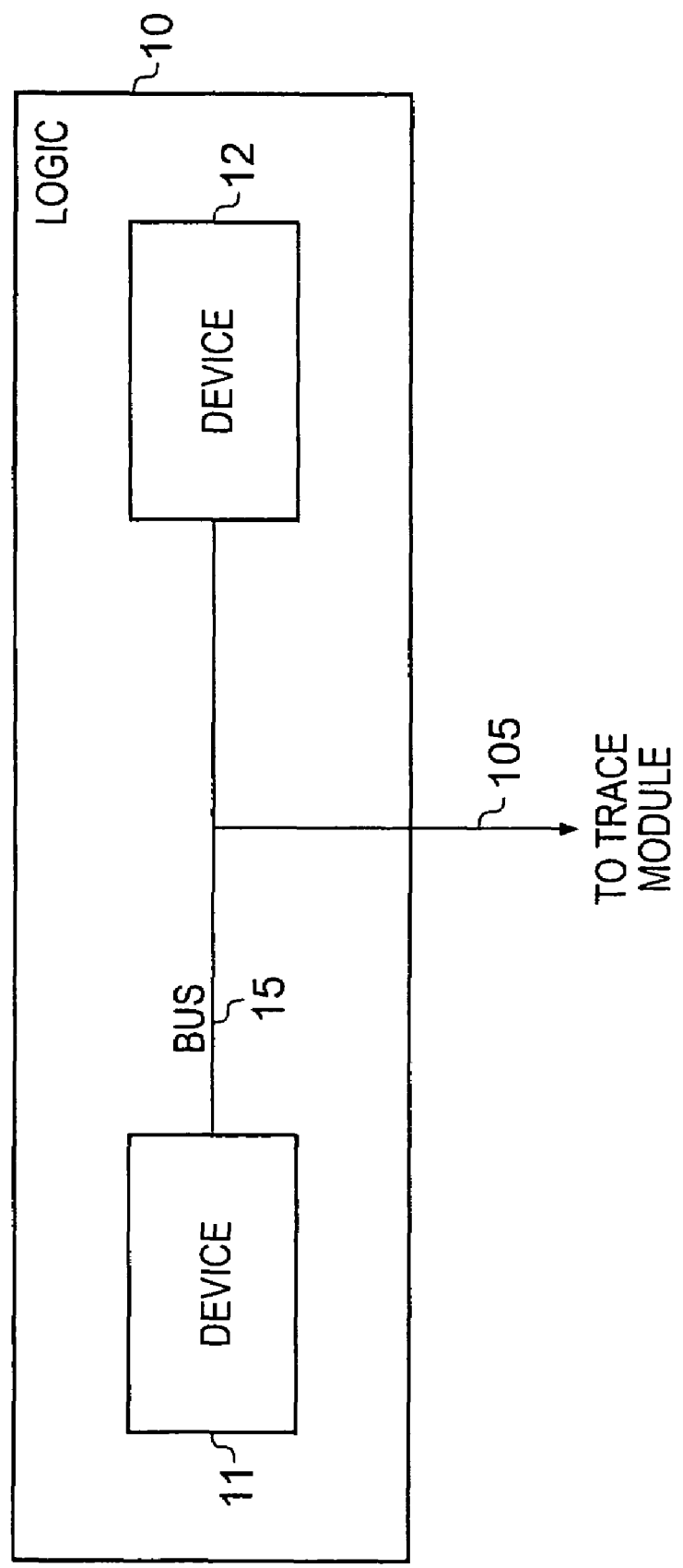
FIG. 2 is a block diagram illustrating an example of the logic block of FIG. 1 in accordance with one embodiment.

FIG. 2 is a block diagram of an example of the logic 10 of FIG. 1. In this example the logic 10 comprises two devices (11,12) connected by a bus 15. The bus is linked to the trace module 20, via connection 105, over which data elements produced by the logic are passed.

Figure 3:
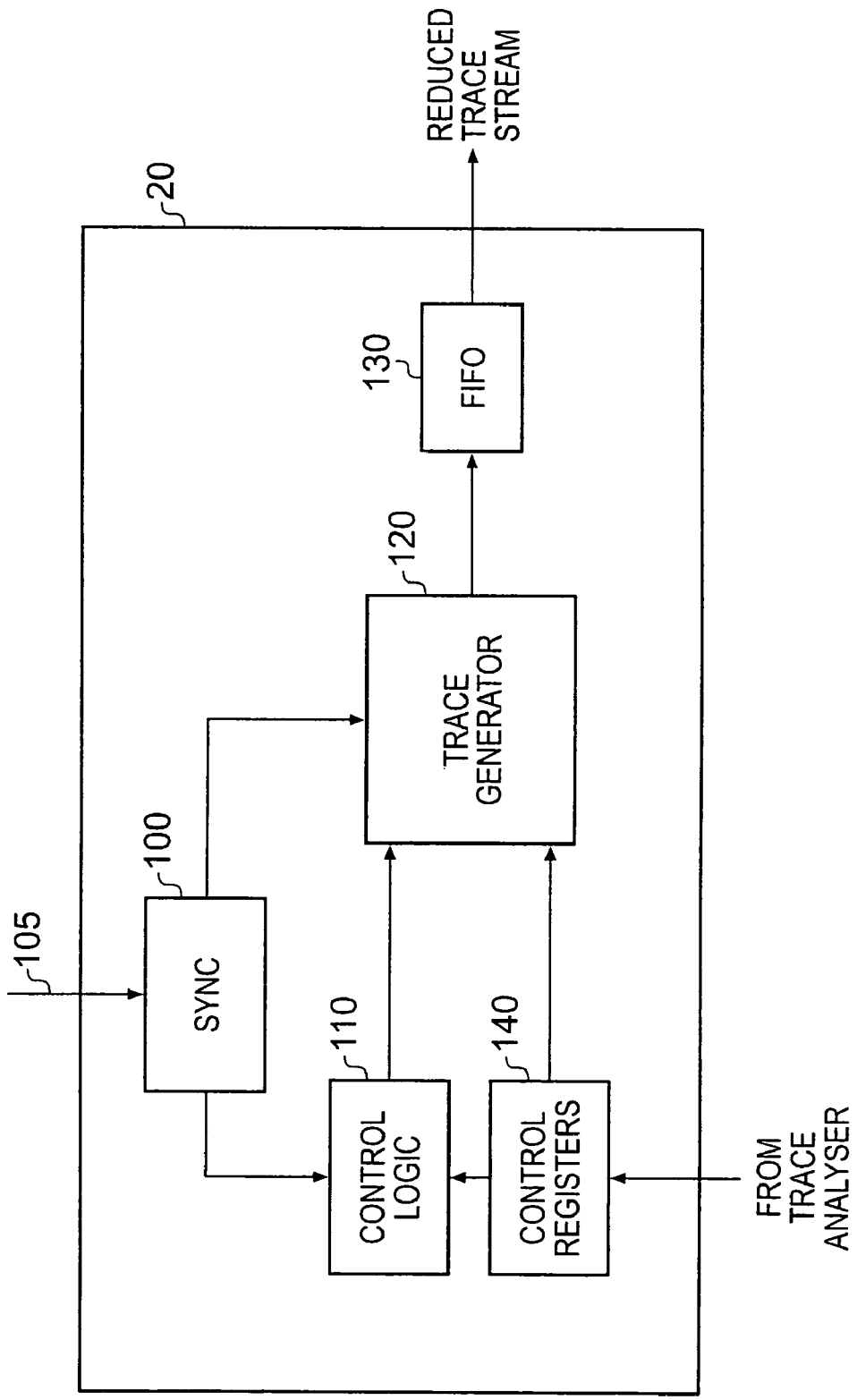
FIG. 3 is a block diagram illustrating in more detail the on-chip trace module of FIG. 1 in accordance with one embodiment.

FIG. 3 is a block diagram of the trace module 20 in accordance with one embodiment. The trace module 20 is arranged to receive over path 105 data elements indicative of the state or operation of the logic being traced. The sync logic 100 is arranged to convert the incoming signals into internal versions of the signals more appropriate for use within the trace module 20. These internal versions are then sent to the control logic 110 and the trace generation logic 120, although it will be appreciated that the control logic 110 and the trace generation 120 will not necessarily need to receive the same signals. Fundamentally, the control logic 110 needs to receive data relating to triggerable events, for example instruction addresses, data values, register accesses, etc so that it can determine whether trace should be activated, and what types of data elements should be traced. It then issues appropriate control signals to the trace generation logic 120 to cause the required trace elements to be generated by the trace generation logic 120. The trace generation logic 120 receives via the sync logic 100 any data that would need to be traced dependent on the control signals issued by the control logic 110.

In accordance with embodiments of the present invention, control registers 140 are provided which are used to configure the operation of the control logic 110, these control registers 140 being settable from the trace analyser 40. A number of control registers can be provided, which fundamentally direct two elements of the trace generation logic operation— "when" to generate trace elements, e.g. when a particular range of addresses is accessed, and "what" to generate those trace elements for, e.g. the data address and/or data value of a particular transfer and, typically, supplementary information about the transfer such as whether it is a read or a write operation, whether it is locked, security information etc.

Triggered by a control signal issued by the control logic 110 that a "when" condition is met, the trace generation logic 120 generates the required trace elements indicative of the data elements it is receiving from the sync logic 100, in accordance with the associated "what" signal it also receives from the control logic. These generated trace elements are output to the FIFO 130. From here, the trace stream is then output to the trace buffer 30, or in alternative embodiments is output directly to the trace analyser 40.

One embodiment of the present invention makes use of the fact that the same tool which programs these control registers 140 will typically also be in control (directly or otherwise) of the analysis of the stream of trace elements. Hence, of particular interest to embodiments of the present invention are one or more control registers employed to store control values that are indicative of data elements, or parts of data elements, which may be represented in abbreviated form in the generated stream of trace elements by an indication of the corresponding control register. In embodiments of the present invention, the represented data element may for example be a data address value, a data value or an instruction address value. Alternatively, the represented data element may be a part of a data address value, a data value or a instruction address value. Thus, in such an embodiment, when the trace generation logic 120 receives a control signal from control logic 110, indicating that it should generate trace in respect of the data elements it is receiving from sync logic 100, the trace generation logic is operable to refer to the control registers 140 to determine if there is a control value stored there which may be referenced to enable it to represent, at least in part, a received data element in a trace element of the generated trace stream.

More details as to how the control registers 140 are used by the trace generation logic 120 to identify data elements which may be represented in abbreviated form in the output trace stream will be discussed in more detail later with reference to the flow diagram of FIG. 5.

Figure 4:
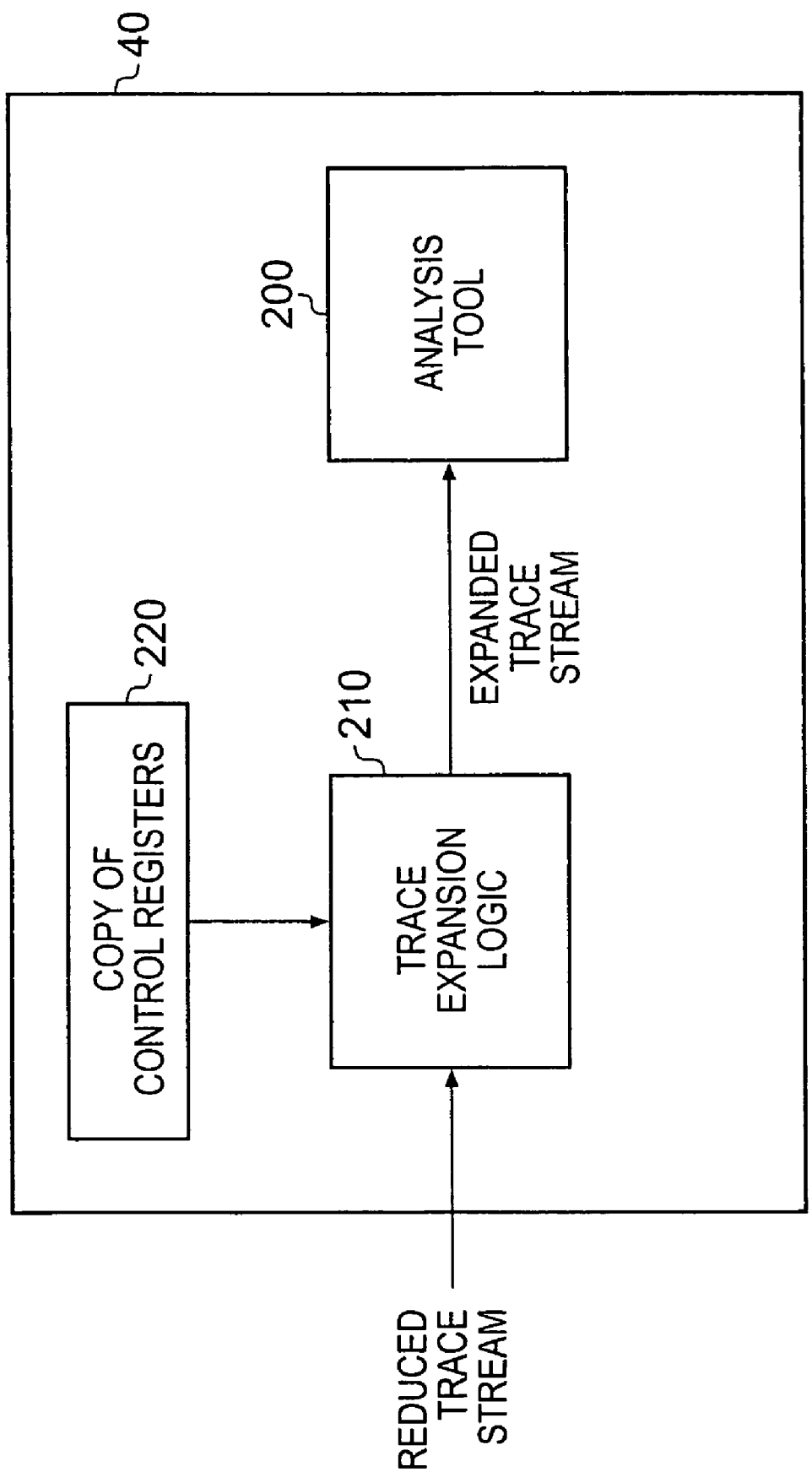
FIG. 4 is a block diagram illustrating in more detail the trace analyser of FIG. 1 in accordance with one embodiment.

FIG. 4 is a block diagram illustrating in more detail the operation of the trace analyser 40 in accordance with one embodiment of the present invention. The trace stream output by the on-chip trace module 20 is received by the trace expansion logic 210, this input trace stream being a reduced trace stream in that certain data element indications, for example data address indications or data value indications, will have selectively been replaced by indications of particular control registers. The trace expansion logic 210 is arranged to seek to replace omitted data element indications in the trace stream in order to output an expanded trace stream for forwarding onto the analysis tool 200, which will typically be formed by software executing on the trace analyser 40.

To assist the trace expansion logic 210 in performing this function, a copy 220 of the control values stored in control registers 140 is provided within the trace analyser 40. Where a trace element of the trace stream includes an indication of a referenced control register, the trace expansion logic 210 can reference the copy 220 of the control values stored in the control registers 140 in order to identify an explicit data element indication and produce an expanded trace stream including a direct indication thereof to pass to the analysis tool 200.

Figure 5:
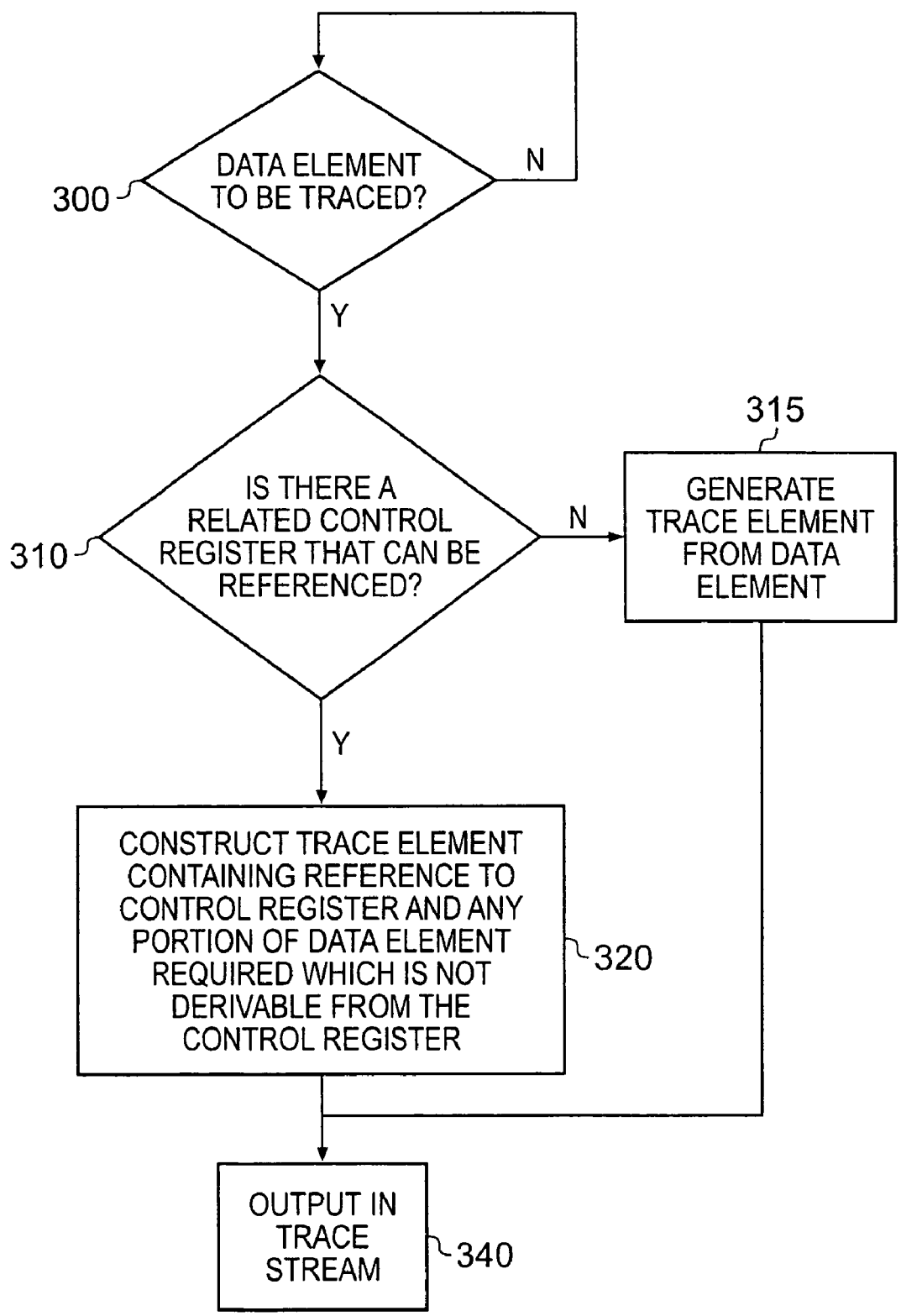
FIG. 5 is a flow diagram illustrating a sequence of steps performed within the on-chip trace module of FIG. 1 in accordance with one embodiment.

FIG. 5 is a flow diagram illustrating how the trace generation logic 120 of the on-chip trace module 20 uses the control registers 140 when deciding, for a data element identified for being traced, whether the consequent trace element produced can include a reference to a particular control register to reduce the quantity of data included in the trace element. At step 300, it is determined whether a data element received on path 105 is to be traced, i.e. whether a data element received on path 105 has caused control logic 110 to signal to trace generation logic 120 that a corresponding trace element should be produced. If this is the case, then at step 310 it is determined by the trace generation logic whether there is a control register storing a control value which can be referenced to represent, at least partially, that data element in the output trace stream.

If such a control register does not exist, then at step 315 the trace generator 120 generates a trace element corresponding directly to the received data element. If, however, such a control register does exist, then at step 320 the trace generator 120 constructs a trace element wherein any portion of the received data element that is derivable from a reference to a control register storing a control value is replaced in the constructed trace element by a reference to that control register. Any remainder of the data element, i.e. any portion not derivable with reference to a control register, may then additionally be included in the constructed trace element. Alternatively, the reference to the control register may be accompanied by an indication of the location within the received data element where the data element differs from the referenced control value. For example, the referenced control value and the received data element might be instruction address values, wherein the received data element differs only from the referenced control value in the 2 least significant bits (LSBs). In this instance, the constructed trace value could consist of a reference to the corresponding control register and an indication that the 2 LSBs do not match. As indicated above, the constructed trace value could more explicitly contain an indication of what those 2 LSBs in the received data element are.

Finally, at step 340 the generated trace element, whether constructed directly from the received data element at step 315, or constructed with reference to a control register at step 320, is output in the stream of generated trace elements.

It will be appreciated that FIG. 5 does not illustrate other processing performed by the control logic 110. For example, as mentioned earlier, the control registers 140 are used to configure the operation of the control logic 110, these control registers 140 being settable from the trace analyser 40. Examples of the configuration parameters settable by the control registers (under control of the trace analyser) are indications of what values (for example addresses or data values) are required to be output in the generated trace stream and/or indications of when the trace stream should be generated, e.g. for transfers within a particular region of memory.

Figure 6:
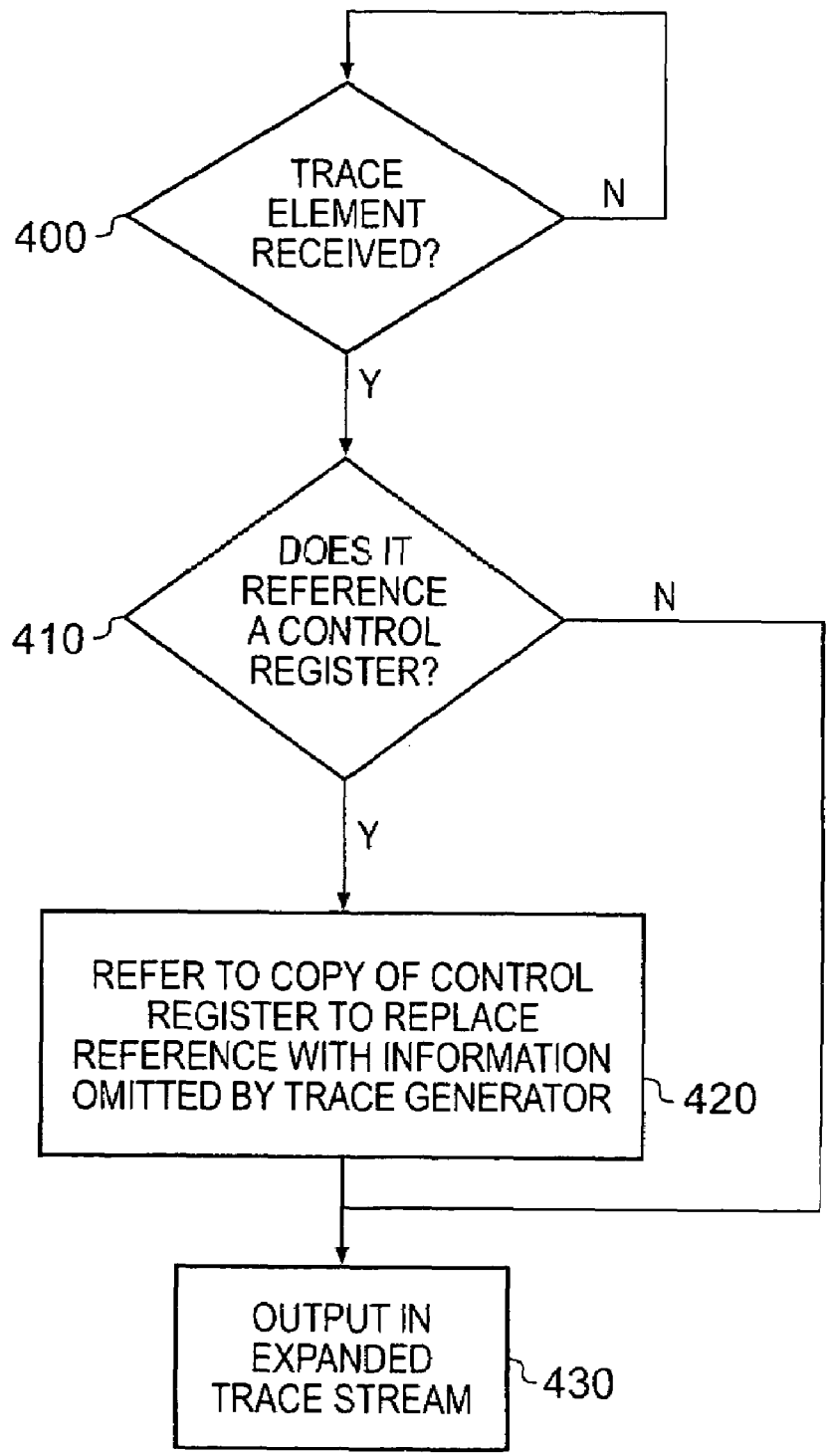
FIG. 6 is a flow diagram illustrating a sequence of steps performed within the trace analyser of FIG. 1 in accordance with one embodiment of the present invention.

FIG. 6 illustrates a process performed within the trace analyser 40 of FIG. 1 in accordance with one embodiment, and in particular illustrates a process performed by the trace expansion logic 210 of FIG. 3. At step 400, a trace element is identified from the received reduced trace stream, whereafter at step 410 it is determined whether the received trace element contains a reference to a control register 140. If it does not, then the trace element is passed unchanged to be output at step 430.

If at step 410 the received trace element is determined to contain a reference to a control register, then at step 420 the trace expansion logic 210 is operable to make use of a copy 220 of the control registers and their contents to construct an expanded trace element. The trace expansion logic is operable to derive an omitted data element indication from the content of the relevant control register, which may for example include replacement of the control register indication with the contents of that control register. When the reference to the control register is accompanied by an indication of the location within the received data element where the data element differs from the referenced control value, then the trace expansion logic's operation may include removing the reference and replacing it with the corresponding control value, retaining the indication of the difference to the referenced control value.

The trace element thus formed, whether unaltered by bypassing step 420 or reconstructed in step 420, is then at step 430 output in the expanded trace stream to be passed to the analysis tool 200.

Figure 7:
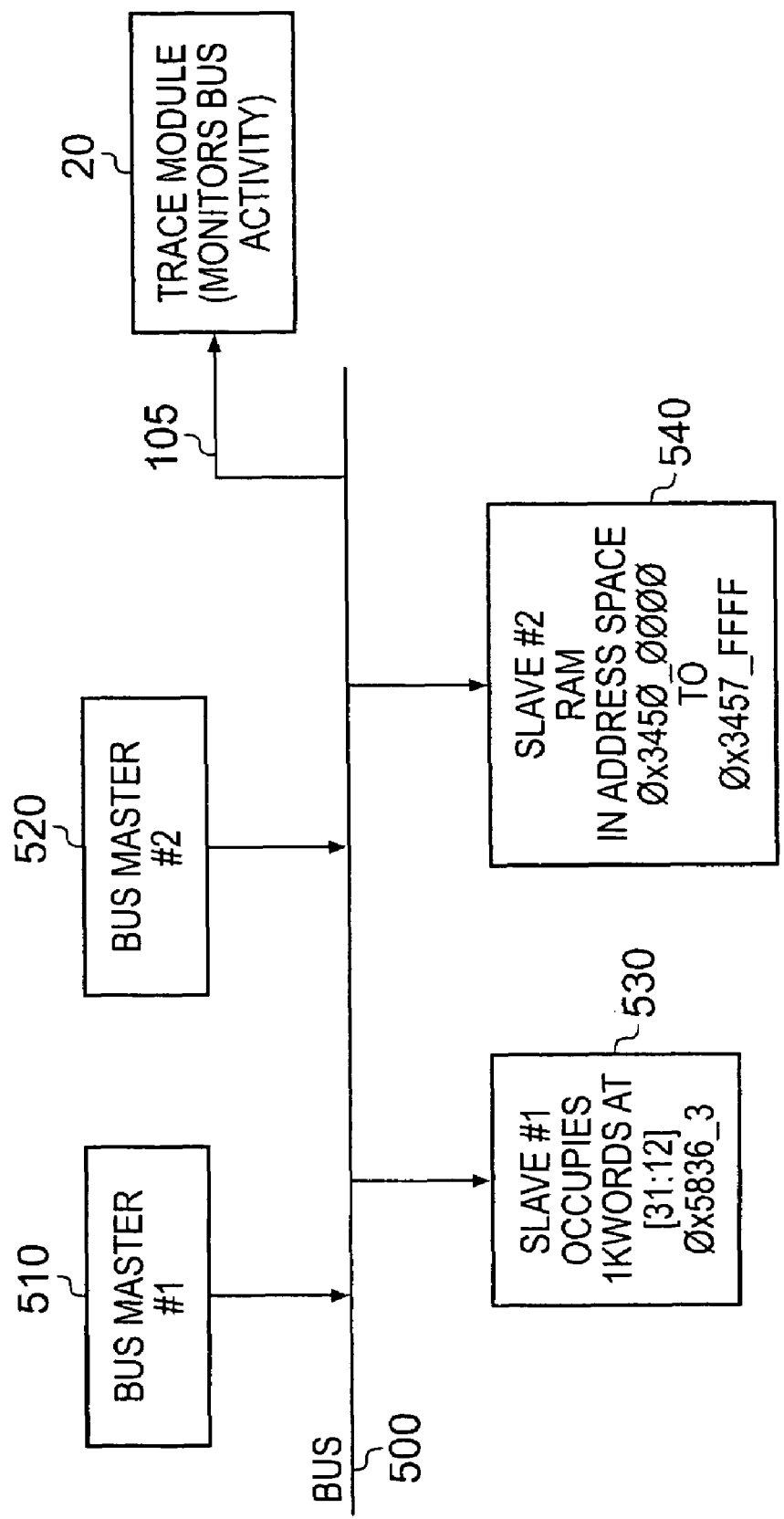
FIG. 7 is a block diagram illustrating an example system within which the present invention might be employed.

FIG. 7 is a block diagram illustrating an example system in which the present invention is used to monitor activity on a bus connecting two masters and two slaves. In this example, bus master 510 and bus master 520 are connected to bus 500, via which they may issue memory access requests to slave 530 and slave 540. The bus is also connected to trace module 20 such that activity on the bus may be monitored. Each of the slaves is allocated a region of address space, addressable in this example by 32-bit addresses. Slave 530 is defined to occupy addresses defined by bits [31:12] being 0×5836_3. Slave 540 occupies the address range 0×3450_0000 to 0×3457_FFFF. If the bus activity related to these two slaves were required to be monitored then the control registers 140 of FIG. 3 would be correspondingly configured. For example to monitor the activity related to slave 530, then indications of all activity within the address range 0×5836_3000 to ×5836_3FFF may be output by the trace module, since this represents the address range corresponding to bits [31:12] being 0×5836_3 and the following 12 bits [11:0] ranging from 0×000 (all 0's) to 0×FFF (all 1's). To effect this, the "when" configuration of the control logic 110, defined by the contents of the control registers 140, could be set to trigger tracing of all addresses which match 0×5836_3000 with a mask of 0x0000_0FFF. Similarly to further monitor some of the activity related to slave 540, the control registers could also set the "when" configuration to trigger tracing of all addresses within the range 0x3450_0000 to 0x3458_0000 with the offset 0x0000_0F00, effectively resulting in a second "when" configuration of address 0x3450_0F00 with a mask of 0x000_F000. The trace elements produced in respect of bus activity related to these two slaves could include a full address for each matching transfer, but the inventor of the present invention realised that an advantageous reduction in the quantity of trace data produced could be achieved by instead producing a reference to the matching "when" configuration and the extra information excluded from the match i.e. the components of the address specified within the mask value.

Figure 8:
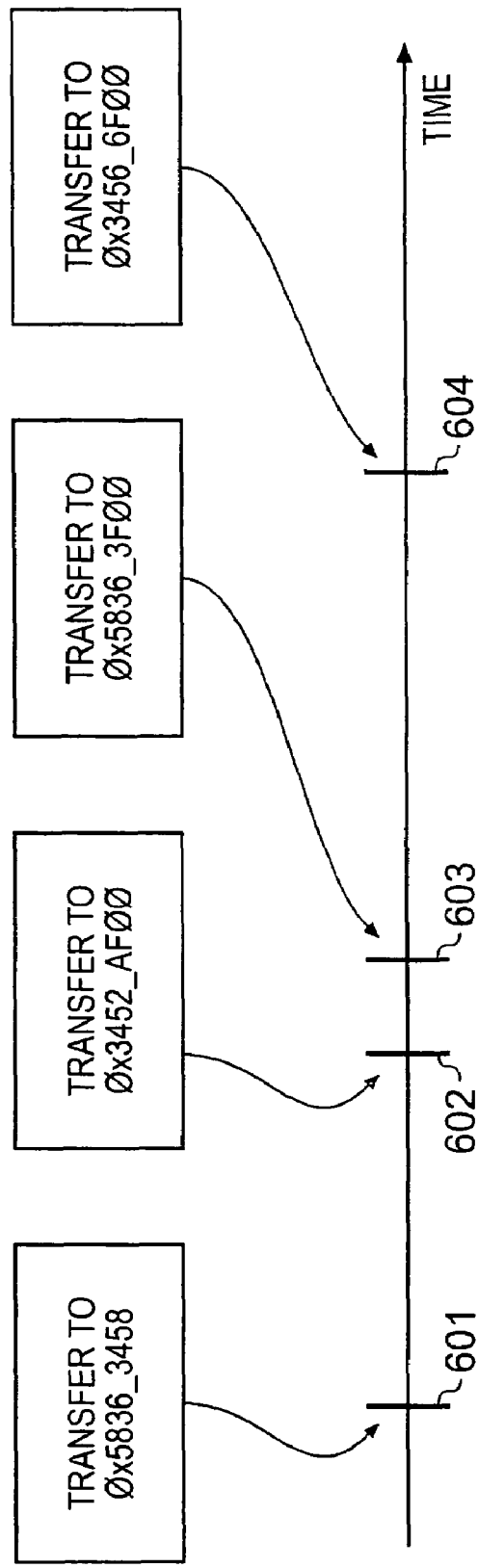
FIG. 8 is a block diagram illustrating an example sequence of events in the system of FIG. 7 which might be traced.

The tracing of bus activity in the example of FIG. 7 will be further illustrated with reference to FIG. 8, which shows example activity wherein transfers 601 to 604 to four different addresses take place sequentially corresponding to address spaces occupied by slaves 530 and 540. The example transfers of FIG. 8, traced by a traditional "full address" scheme of tracing would produce trace such as that shown in Table 1. Using the scheme of an embodiment of the present invention would produce trace such as that shown in Table 2.

TABLE 1

Trace information using existing schemes

| Traced Information | Number of bytes |
| --- | --- |
| Transfer with address (LSB first) | 1 |
| Address values: 0x58; 0x34; 0x36; 0x58 | 4 |
| Transfer with address (LSB first) | 1 |
| Address values: 0x00; 0xAF; 0x52; 0x34 | 4 |
| Transfer with address (LSB first) | 1 |
| Address values: 0x00; 0x3F; 0x36; 0x58 | 4 |
| Transfer with address (LSB first) | 1 |
| Address values: 0x00; 0x6F; 0x56; 0x34 | 4 |
| | Total bytes = 20 |

TABLE 2

Trace information using scheme of an embodiment of the present invention

| Traced Information | Number of bytes |
| --- | --- |
| Storage element indication #1 with address (LSB first) | 1 |
| Data element indications: 0x58; 0x04 | 2* |
| Storage element indication #2 with address (LSB first) | 1 |
| Data element indication: 0x2A | 1 |
| Storage element indication #1 with address (LSB first) | 1 |
| Data element indications: 0x00; 0x0F | 2* |
| Storage element indication #2 with address (LSB first) | 1 |
| Data element indication: 0x66 | 1 |
| | Total bytes = 10 |

(NB: The byte indications with * have one nibble unused)

Thus it is readily apparent that a significant saving in the quantity of trace data that needs to be output (in this example a reduction by half) can be achieved through the use of the above described technique.

A further example usage of the technique of an embodiment of the present invention involves an instruction stream trace. An example stream of instruction address values might be the following: 0x0FF0, 0x0FF4, 0x0FF8, 0x0FFC, 0x1000, 0x1004 ... 0x101C, 0x1020. If only the instructions executing from 0x0FF8 to 0x1014 are required to be traced, then a "start" control value would specify 0x0FF8 and a "stop" control value would specify 0x1014. An example generated trace stream for the required address values when using the technique of an embodiment of the present invention is shown in Table 3. Note that some trace elements contain only a storage element indication ("start" or "stop"), whilst others also contain a data element indication (e.g. 0x4).

TABLE 3

Example of trace element generation for a range of instruction address values. (Note that 0x1008 could be traced as "start" + 0x10, but this would require an extra nibble compared to the negative offset from the "stop" value.)

| Instruction Address | Trace element |
| --- | --- |
| 0x0FF8 | "start" |
| 0x0FFC | "start" + 0x4 |
| 0x1000 | "start" + 0x8 |
| 0x1004 | "start" + 0xC |
| 0x1008 | "stop" − 0xC |
| 0x100C | "stop" − 0x8 |
| 0x1010 | "stop" − 0x4 |
| 0x1014 | "stop" |

From the above description of embodiments of the present invention, it will be appreciated that such embodiments enable a significant reduction in the amount of data that needs to be traced, particularly when full data address/data value tracing is enabled. Embodiments of the present invention hence provide a benefit in terms of increasing the effectiveness of any on-chip trace buffer, since the on-chip buffer may be reduced in size as a consequence, giving a net saving in area. Additionally, the bandwidth required between the on-chip trace module and any off-chip trace buffer is reduced.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
   data element producing logic configured to produce data elements;
   trace logic configured to produce a stream of trace elements representative of at least some of said data elements, the trace logic having trace generation logic configured to generate trace elements for inclusion in said stream and comprising control logic configured to determine which of said data elements are to be represented by said stream of trace elements; and
   at least one storage element, each of said at least one storage element configured to store a control value, the control logic configured to reference the control value in said at least one storage element when performing said determination, wherein, for a data element to be represented in said stream, the trace generation logic, if at least a part of that data element is derivable from the control value re-referenced from said at least one storage element, is configured to generate an associated trace element comprising a storage element indication indicating the storage element storing that control value and any data element indication required to indicate a part of the data element not derivable from that control value.

2. A data processing apparatus as claimed in claim 1, wherein said data element producing logic is a plurality of devices coupled via a bus over which said data elements are routable between the devices.

3. A data processing apparatus as claimed in claim 1, wherein said trace logic is configured to output said stream of trace elements for analysis by a trace analysing tool which has knowledge of the control value stored in each storage element.

4. A data processing apparatus as claimed in claim 1, wherein the control value stored in each storage element is programmable by a trace analysing tool.

5. A data processing apparatus as claimed in claim 1, wherein said data element indication indicates the data content of said part of the data element not derivable from said control value.

6. A data processing apparatus as claimed in claim 1, wherein said data element indication indicates the location within said data element of said part of the data element not derivable from said control value.

7. A data processing apparatus as claimed in claim 1, wherein said data element indication indicates the location within said data element of said part of the data element not derivable from said control value and the data content of said part of the data element not derivable from said control value.

8. Trace logic for generating a stream of trace elements representative of at least some data elements produced by data element producing logic of a data processing apparatus, said trace logic comprising:
   trace generation logic configured to generate trace elements for inclusion in said stream and comprising control logic configured to determine which of said data elements are to be represented by said stream of trace elements; and
   at least one storage element, each storage element configured to store a control value, the control logic configured to reference the control value in said at least one storage element when performing said determination, wherein, for a data element to be represented in said stream, the trace generation logic, when at least a part of that data element is derivable from a control value re-referenced from said at least one storage element, is configured to generate an associated trace element comprising a storage element indication indicating the storage element storing that control value and any data element indication required to indicate a part of the data element not derivable from that control value.

9. A data processing system comprising:
   data element producing logic configured to produce data elements;
   trace logic configured to produce a stream of trace elements representative of at least some of said data elements, said trace logic having trace generation logic configured to generate trace elements for inclusion in said stream and comprising control logic configured to determine which of said data elements are to be represented by said stream of trace elements;
   at least one storage element, each storage element operable to store a control value, the control logic configured to reference the control value in said at least one storage element when performing said determination, wherein, for a data element to be represented in said stream, the trace generation logic, if at least a part of that data element is derivable from the control value re-referenced from said at least one storage element, is configured to generate an associated trace element comprising a storage element indication indicating the storage element storing that control value and any data element indication required to indicate a part of the data element not derivable from that control value;
   a reference storage for storing indications of the control value stored in each storage Element; and
   a trace expander operable to receive the stream of trace elements generated by the trace logic and to produce a modified stream of trace elements containing at least one new data element indication by:
      identifying a storage element indication within the stream of trace elements;
      generating a new data element indication indicating the at least part of the data element derivable from the control value in said storage element indicated by the storage element indication, by reference to said reference store; and
      outputting said new data element indication in said modified stream of trace elements in place of said storage element indication.

10. A data processing system as claimed in claim 9, wherein the reference storage and trace expander are provided by a trace analyzing apparatus for analyzing the stream of trace elements produced by the trace logic.

11. A method of operating a data processing system, comprising the steps of:
   producing data elements;
   employing trace logic to receive indications of said data elements, and to produce a stream of trace elements representative of at least some of said data elements;
   determining, with reference to at least one control value stored in at least one storage element, which of said data elements are to be represented by said stream of trace elements;
   generating, for a data element to be represented in said stream, when at least a part of said data element is derivable from said at least one control value re-referenced from said at least one storage element, an associated trace element comprising a storage element indication indicating the at least one storage element storing that control value and any data element indication required to indicate a part of the data element not derivable from that control value;
   storing in a reference store indications of the control values stored in each storage element of said trace logic; and
   producing from the stream of trace elements generated by the trace logic a modified stream of trace elements containing at least one new data element indication by:
      identifying a storage element indication within the stream of trace elements;
      generating a new data element indication indicating the at least part of the data element derivable from the control value in said storage element indicated by the storage element indication, by reference to the reference store; and
      outputting said new data element indication in said modified stream of trace elements in place of said storage element indication.

12. A method of operating trace logic, comprising the steps of: receiving indications of data elements produced by data element producing logic of a data processing apparatus;
   producing a stream of trace elements representative of at least some of said data elements;

determining, with reference to at least one control value stored in at least one storage element, which of said data elements are to be represented by said stream of trace elements;

generating, for a data element to be represented in said stream, if at least a part of that data element is derivable from the control value re-referenced from said at least one storage element accessible by the trace logic, an associated trace element comprising a storage element indication indicating the at least one storage element storing that control value and any data element indication required to indicate a part of the data element not derivable from that control value.

13. A method of analysing a stream of trace elements generated by trace logic and representative of at least some data elements produced by data element producing logic of a data processing apparatus, wherein at least one control value stored in at least one storage element is referenced to determine which of said data which of said elements are to be represented by said stream of trace elements, and wherein when at least a part of a data element represented in said stream is derivable from said at least one control value re-referenced from said at least one storage element accessible by the trace logic, an associated trace element comprising a storage element indication indicating the at least one storage element storing that control value and any data element indication required to indicate a part of the data element not derivable from that control value, said method comprising the steps of:

storing in a reference store indications of the control values stored in each said storage element of said trace logic;

producing from said stream of trace elements a modified stream of trace elements containing at least one new data element indication by:

identifying a storage element indication within the stream of trace elements;

generating a data element indication indicating the at least a part of a data element derivable from a control value in said storage element indicated by the storage element indication, by reference to the reference store; and outputting said new data element indication in said modified stream of trace elements in place of said storage element indication.

14. A computer program product comprising a computer program stored on a computer readable storage medium and configured to cause a computer to analyse a stream of trace elements generated by trace logic and representative of at least some data elements produced by data element producing logic of a data processing apparatus, wherein at least one control value stored in at least one storage element is referenced to determine which of said data elements are to be represented by said stream of trace elements and wherein when at least a part of a data element represented in said stream is derivable from said at least one control value re-referenced from said at least one storage element accessible by the trace logic, not derivable from that control value, an associated trace element comprising a storage element indication indicating the at least one storage element storing that control value and any data element indication required to indicate a part of the data element not derivable from that control value, said computer program product causing the computer to perform the steps of:

(i) storing in a reference store indications of said at least one control value stored in each said storage element of said trace logic;

(ii) producing from said stream of trace elements a modified stream of trace elements containing at least one new data element indication by:

identifying a storage element indication within the stream of trace elements;

generating a data element indication indicating the at least part of a data element derivable from a control value in said storage element indicated by the storage element indication, by reference to the reference store; and outputting said new data element indication in said modified stream of trace elements in place of said storage element indication.

* * * * *